(12) United States Patent
Koochakzadeh et al.

(10) Patent No.: US 11,163,800 B2
(45) Date of Patent: Nov. 2, 2021

(54) EFFICIENT PARTITIONING OF RELATIONAL DATA

(71) Applicant: Oracle International Corporation, Redwood Shores, CA (US)

(72) Inventors: Negar Koochakzadeh, Vancouver (CA); Nitin Kunal, Zurich (CH); Sam Idicula, Santa Clara, CA (US); Cagri Balkesen, Zurich (CH); Nipun Agarwal, Saratoga, CA (US)

(73) Assignee: Oracle International Corporation, Redwood Shore, CA (US)

( * ) Notice: Subject to any disclaimer, the term of this patent is extended or adjusted under 35 U.S.C. 154(b) by 271 days.

(21) Appl. No.: 16/541,605

(22) Filed: Aug. 15, 2019

(65) Prior Publication Data

US 2019/0370268 A1 Dec. 5, 2019

Related U.S. Application Data

(63) Continuation of application No. 15/438,521, filed on Jan. 21, 2017.

(51) Int. Cl.
*G06F 17/30* (2006.01)
*G06F 16/27* (2019.01)
*G06F 16/21* (2019.01)

(52) U.S. Cl.
CPC .......... *G06F 16/278* (2019.01); *G06F 16/211* (2019.01)

(58) Field of Classification Search
USPC ............................................. 707/736; 711/5
See application file for complete search history.

(56) References Cited

U.S. PATENT DOCUMENTS 6,549,931 B1 * 4/2003 Amor ................... G06F 9/5066
707/999.2
7,293,011 B1 * 11/2007 Bedi ................. G06F 16/24532
(Continued)

OTHER PUBLICATIONS

S. Manegold et al., "Optimizing main-memory join on modern hardware". IEEE Trans. Knowl. Data Eng., 14(4):709-730, dated 2002.

(Continued)

*Primary Examiner* — Hung T Vy
(74) *Attorney, Agent, or Firm* — Hickman Becker Bingham Ledesma LLP

(57) ABSTRACT

Techniques for non-power-of-two partitioning of a data set as well as generation and selection of partition schemes for the data set. In an embodiment, one or more iterations of a partition scheme is for a non-power-of-two number of partitions. Extended hash partitioning may be used to partition a data set into a non-power-of-two number of partitions by determining the partition identifier of each tuple of the data set using the extended hash partitioning algorithm. In an embodiment, multiple partition schemes are generated for multiple data sets, based on properties of the data sets and/or availability of computing resources for the partition operation or the subsequent operation to the partition operation. The generated partition schemes may use non-power-of-two partitioning for one or more iterations of a generated partition scheme. The most optimal partition scheme may be selected from the generated partition schemes based on optimization policies.

20 Claims, 8 Drawing Sheets

(56) References Cited

U.S. PATENT DOCUMENTS

2006/0224551 A1\* 10/2006 Lariba-Pey ......... G06F 16/2456
2007/0016560 A1\* 1/2007 Gu .................... G06F 16/90344
2011/0078359 A1\* 3/2011 Van Dyke ............... G06F 12/10
  711/5
2018/0239808 A1 8/2018 Koochakzadeh

OTHER PUBLICATIONS

S. Lee et al., "Partitioned Parallel Radix Sort", JPDC dated 2001, 13 pages.
J. Cieslewicz et al., "Data Partitioning on Chip Multiprocessors", Fourth International Workshop on Data Management on New Hardware (DaMoN), dated 2008, 10 pages.
C. Kim et al., "Sort vs. Hash Revisited: Fast Join Implementation on Modern Multi-Core CPUs", VLDB 2009, 12 pages.
A. Shatdal et al., "Cache conscious algorithms for relational query processing", VLDB, pp. 510-521, dated 1994.
Koochakzadeh, U.S. Appl. No. 15/438,521, filed Feb. 21, 2019, Notice of Allowance, dated Nov. 8, 2019.
Koochakzadeh, U.S. Appl. No. 15/438,521, filed Feb. 21, 2017, Notice of Allowance, dated May 16, 2019.
Koochakzadeh, U.S. Appl. No. 15/438,521, filed Feb. 21, 2017, Office Action, dated Nov. 29, 2018.

\* cited by examiner

EFFICIENT PARTITIONING OF RELATIONAL DATA

BENEFIT CLAIM

This application claims the benefit, under 35 U.S.C. § 120, as a divisional of U.S. patent application Ser. No. 15/438,521, filed Feb. 21, 2017, the entire contents of which is hereby incorporated by reference as if fully set forth herein. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates generally to database management systems and more particularly to efficient partitioning of relational data in cluster assisted database management systems.

BACKGROUND

Executing queries on large amounts of data (colloquially known as "big data") poses a great challenge for database management systems (DBMS). Conventional methods generally require data for queries to be loaded into operational memory from persistent memory to be processed. With data for a single query execution reaching large scales of terra bytes, the operational memory may not be able to hold the full data set required for the query execution. In such a scenario, the spill over data may extend into slower memory that has higher storage capacity but much slower input/output (I/O) speed. Processing operations by shuttling data to and from slower memory would substantially decrease the performance of the query and affect the user experience.

For example, when a query is executed on a table with big data, all rows from the big data table are loaded into a buffer. As a result, the buffer may contain billions of rows and may span over multiple types of memory, which most likely would include slower memories like disk memory. The rows in the buffer may be operated on, for example joined or sorted. Performing such operations on so many rows involving random accesses of slower memory consumes enormous amounts of computing resources of the DBMS, while the use of slower memory in its turn introduces substantial latency in the processing.

To handle the challenge of big data, new architectures have been developed for computer hardware to process big data in parallel. For example, today's computing nodes usually utilize multiple multi-core processors, in which each multi-core processor consists of multiple independent processing units to execute instructions in parallel manner. Further, multiple computing nodes, each containing such processing units, can be networked into a cluster of computing nodes, each node, in addition to processing units, having a modest amount of memory and non-persistent storage for storing table data accessed by query processing. A cluster of computing nodes can have a very large number, in fact, thousands of nodes. The total memory and processing power of the large number of nodes of a cluster provides advantage over conventional systems, particularly when nodes perform operations for query processing in parallel. Such cluster of computing nodes may be used for a DBMS and is referred herein as "cDBMS."

Although, cDBMS provides the capability of great parallelization in query processing, a computing node of a cluster is still limited by the amount of fast access memory within the node. Indeed, each node has access to multiple types of memory having different speeds and storage capacity, with higher speed memory having lower storage capacity. For example, data operations on cache memory are magnitudes faster than the data operations on disk memory, while the capacity of the disk memory is generally many magnitudes more than the cache memory. Therefore, it is critical for a computing node to ensure that the data operations are performed on a smaller data that can fit into higher speed lower storage capacity memory. Accordingly, the big data database objects or portions thereof have to be distributed not only for parallel processing but also to minimize access to slower memory in the cDBMS.

However, the operation to distribute the big data among the nodes and processing units of nodes itself consumes great amount of computing resources. In many cases, the partition operation (as referred herein) is the costliest operation in a query execution plan and may even defeat the gains in resource utilization gained by parallelizing the execution of queries and minimizing I/O for the big data.

For example, using the range distribution for partitioning may introduce additional computational steps for each tuple in the data to be partitioned. Not only does the cDBMS have to compute the ranges based on which the data is to be partitioned, but for each tuple to distribute, the cDBMS has to calculate to what range the tuple belongs. Furthermore, the cDBMS has to have prior knowledge of the value distribution in a partitioning key, a column in data set of tuples based on which the tuples are to be distributed. Only with such knowledge can the cDBMS evenly distribute tuples among processing units.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1:
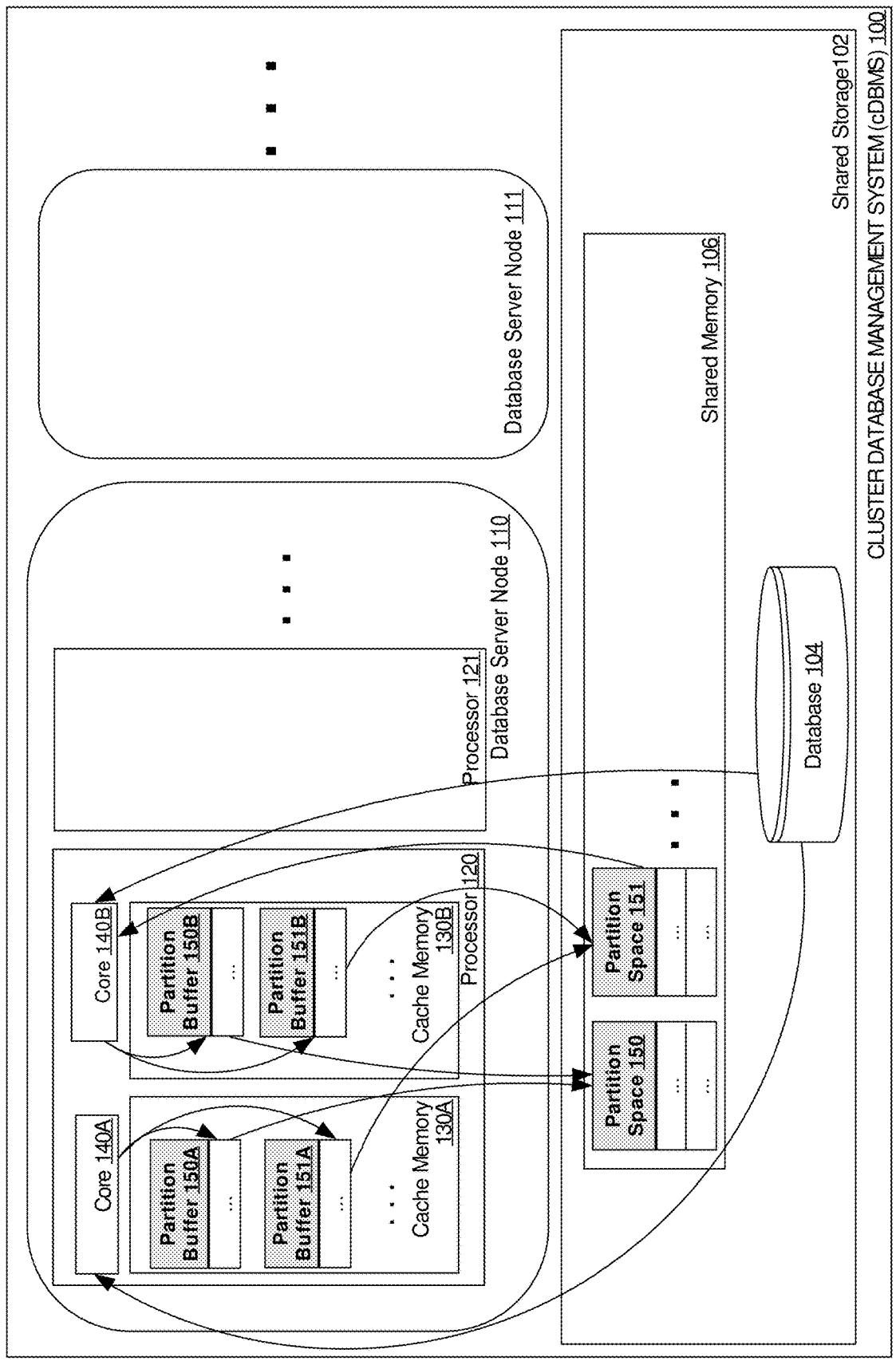
FIG. 1 is a block diagram that depicts cluster database management system (cDBMS) 100 that executes a partition operation, in an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

One solution to decrease the cost of partition operation is to utilize hash distribution techniques. Using the hash distribution techniques, the cDBMS applies a hashing algorithm on a partition key value of a tuple to produce a hash value of the partition key, referred herein as a "partition hash." Examples of hashing or hash algorithms are a Cyclic Redundancy Check (CRC) algorithm, Secure Hash Algorithm (SHA), or Message Digest (MD) of various bit length such as 32, 64, 128, 256 or 512 to list few.

The term "partition key" refers herein to a column of a data set based on which the tuples in the data set are distributed. For example, in a partition operation for a join operation, the partition keys are the columns on which the join operation is performed. Similarly, for a group-by operation, the partition key is the operand column(s) in the group-by operation.

To ensure an even distribution of tuples among a target number of partitions in a partition operation, the cDBMS generates a partition hash from a partition key value of a tuple, in an embodiment. The cDBMS uses at least a portion of a generated partition hash to determine the partition identifier of the partition into which to distribute the tuple. In an embodiment, the partition identifier is based on a number of bits in the partition hash. The term "address bits" refers herein to those bits in a partition hash that are used for determination of a partition identifier.

In an embodiment, the address bits of partition hashes of tuples are in fact the actual partition identifiers for the tuples. In such an embodiment, the tuples may be evenly distributed among a power of two number of partitions, the power of two number being equal to number of the address bits used exponentiated to power of two. The tuples would be evenly distributed among the partitions because, as a result of hashing partition key values of the tuples, address bits from a partition hash vary with equal probability from zero to the power of two to the number of address bits used. For example, if five address bits are used as a partition identifier, corresponding tuples can be evenly distributed into $2^5=32$ target partitions. Thus, if the cDBMS determines that the target number of partitions is a power of two number, then it can select the exponent as the number of address bits to use for a partition identifier from a partition hash. Partitioning technique that directly uses a number of address bits as a partition identifier is referred herein as "power-of-two partitioning" or simply "hash partitioning."

In some embodiments, the cDBMS may determine that a target number of partitions for a partition operation should be a non-power of two number. Selecting address bits of a partition hash for a partition identifier in such embodiments causes either more or less than target number of partitions created. Since the target number of partitions is determined to maximize the resource utilization of the cDBMS, such a mismatch between the target and actual number of partitions causes imbalance with the target number of partitions. The query execution with the imbalance partition operation would be inefficient causing waste of resources and negatively affecting the performance of the query execution.

In an embodiment, for a non-power-of-two target number of partitions, the cDBMS extends hash partitioning by selecting and scaling a particular address bit portion of a partition hash. Using extended hash partitioning, the cDBMS calculates a partition identifier for each partition hash such that the total number of partitions identifiers is equal to a non-power-of-two target number of partitions. Since the extended hash partitioning is still based on a particular number of address bits in a partition hash, the partitions generated by the extended hash partitioning may be further partitioned into a power-of-two number or non-power of two number of partitions based on the remaining bits in a partition hash.

As tuples are read from the database, each processing unit of the cDBMS hashes the partition key of the tuple and determines the partitioning identifier for the tuple, in an embodiment. Once the partition identifier is determined by the cDBMS, the cDBMS stores the tuple in corresponding memory space allocated for a partition, referred herein as a "partition buffer." When the target number of partitions is high, and thus, the number of partition buffers is high, the processing unit may not have enough memory to store all the partitioning buffers in fast access memory. The processing unit may then be forced to store additional partition buffers in slow access memory. Each time a tuple is determined to be for a particular partition buffer on slower access memory, one or more partition buffers in the fast access memory need to be swapped out with the particular partition buffer to perform the distribution of the tuple. Such fast access memory misses and swaps with slower access memory can considerably affect the performance of partitioning and thus the overall execution of the query.

In an embodiment, to reduce the necessity to access the slow access memory, the cDBMS may perform the partitioning in iterations. In each iteration, the cDBMS partitions tuples of a data set in as many partitions as each processing unit has fast access memory to fit them. In the next iteration, the cDBMS further partitions each of those partitions into another set of partitions. Consequently, the total number of partitions after these two iterations is the number of partitions in the first iteration multiplied by the number of partitions in the second iteration.

In an embodiment in which multiple iterations of partitioning is performed, a target number of partitions may be achieved through multiple permutations of different number of iterations and different number of partitions per iteration. Each permutation to achieve the target number of partitions is referred herein as a "partition scheme." The number of partitions per iteration may be constrained by the maximum number of partitions that a processing unit may partition a particular data set given the constraint on the size of available fast access memory and characteristics of the particular data set. The term "maximum fan-out" of a data set refers to this maximum number.

In an embodiment, before performing a partition operation, the cDBMS generates a number of alternative partition schemes for the partition operation based on the maximum fan-out of data sets involved and the target number of partitions. The cDBMS evaluates each of the partition schemes based on optimization policies based on one or more of load balance, number of iterations, and partitions per iteration. The term "optimization policy" for a partition operation refers herein to preferences and constraints for partitioning a data set that maximizes the performance of the partition operation and/or the subsequent operation. Using the optimization policies, the cDBMS eliminates partition schemes that may under-perform in partitioning one or more data sets, selecting a partition scheme determined to perform the best for the partitioning of the data sets. Once selected, the cDBMS follows the selected partition scheme to partition the data sets in one or more iterations using power-of-two and/or non-power-of-two hash partitioning as indicated by the selected partition scheme itself.

Architectural Overview

FIG. 1 is a block diagram that depicts cluster database management system (cDBMS) 100 that executes a partition operation, in an embodiment. cDBMS 100 includes database 104 that persistently stores data sets that may be retrieved by one or more nodes of cDBMS 100. Each node, such as node 110, may have multiple processing units executing operations in parallel. For example, cores 140A/B of processor 120 and cores of processor 121, and other processing units of other nodes, such as node 111, may all execute the same partition operation in parallel.

During the parallel execution of a partition operation, each core reads a portion of an operand data set from database 104, in an embodiment. The stream of tuples resulting from reading the portion may be processed by the core using fast access memory to which the core has access. For example, core 140A utilizes cache memory 130A, while core 140B utilizes cache memory 130B for processing tuples. Each tuple is distributed into one of partition buffers in cache memory based on a generated partition identifier. Thus, each processing unit executing the partition operation maintains partition buffers for each partition and thus each partition identifier. For example, partition buffer 150A and partition buffer 150B are for the same partition identifier, yet are maintained by different processing units, core 140A and core 140B respectively.

In an embodiment, once one or more of partition buffers for a processing unit are full with distributed tuples, the partition buffers are written out to corresponding partition spaces in slower memory. The slower access memory may be shared among the nodes of cDBMS 100 so each node's processing unit(s) could write the distributed tuples into the same partitions. For example, shared memory 106 is shared among nodes of cDBMS 100 and has partition space 150 allocated for partition buffers 150A/B and partition space 151 allocated for partition buffers 151A/B. Once all or any of partition buffers 150A/B and 151A/B are full in cache memories 130A/B, the tuples in the partition buffers 150A/B and 151A/B are written out to corresponding partition spaces 150/151 of slower shared memory 106.

In an embodiment, cDBMS 100 may have multiple layers of shared memory. For example, node 110 may have volatile system memory (not depicted in FIG. 1) that is shared between processors 120 and 121. Such intermediate layer memory may maintain another set of partition spaces that are written into from a higher layer, faster access memory such as cache memories 130A/B and are written out to a lower layer, slower access memory, such as shared memory 106. Each layer of memory may maintain the same number of partitions corresponding to the same partition identifiers as the fast access memory of each processing unit.

In another embodiment, processing units of cDBMS may share fast access memory. For example, cache memory may be shared between core 140A and core 140B and a single partition buffer (not depicted in FIG. 1) is maintained for each partition identifier. In such an embodiment, each processing unit can write into a same partition buffer. Once one or more of this shared partition buffers are full, the shared partition buffers may be written out to partition spaces in lower layer, slower access memory that is shared with other processing units of other processors or other nodes in cDBMS 100.

A partition buffer may reach its capacity before cDBMS 100 completes an iteration of partitioning tuples, i.e. before all tuples from the data set of partition operation are fully distributed for the iteration. If so, then multiple rounds of writing out of distributed tuples from faster access buffers to partition spaces on slower access memory may occur for each iteration of a partition operation. Each round of writing out tuples from a higher-level access memory partition buffers to lower level slower access memory partition spaces considerably delays the completion of the partition operation.

Using techniques described herein, cDBMS 100 selects an optimal number of partition buffers to minimize the number of rounds that tuples from partition buffers of fast access memory need to be written out to slower access memory. In particular, cDBMS 100 may select a non-power-of-two number of partition buffers to optimize the size of a partition buffer and minimize the number of rounds (of write-outs to slower memory) necessary for an iteration.

Additionally or alternatively, using techniques described herein, cDMBS 100 may select such combination of a non-power-of-two or a power-of-two numbers of partitions (and thus partition buffers) per each iteration as to minimize the number of iterations for a partitioning operation. As each iteration may necessitate at least one round of write out from partition buffers to partition spaces in slower access memory, the reduced number of iterations reduces the number of write-outs and thus increases the performance of the partition operation.

Fan Out Per Iteration

However, if cDBMS 100 selects a number of partitions in an iteration that exceeds the maximum fan-out of a data set, then a portion of partitions buffers of the data set may not fit within fast access memory. The overflow of partition buffers into slower access memory would force the processing units to access slower access memory when a tuple is determined to be for a partition buffer stored on the slower access memory. Each such slower access memory may delay the execution of the partition operation.

To avoid partition buffers' overflow, cDBMS 100 may limit in an iteration the number of partitions to distribute tuples into, such that the number of partitions buffers does not exceed the maximum fan-out for the data set of the tuples.

In an embodiment, cDBMS 100 determines the maximum fan-out for a data set of tuples based on a size of a tuple and available amount of fast access memory for a processing unit. cDBMS 100 may divide the fast access memory size by the calculated minimum size of a partition buffer for tuples of the data set. The minimum size for a single partition buffer of tuples may be calculated based on the size of a tuple. cDBMS 100 may obtain data statistics about data set to obtain a tuple size. The data statistics may be based on one or more aggregation functions, such as average, median, minimum and maximum, applied to tuple sizes in a data set.

Additionally or alternatively, the minimum size of a partition buffer may also be based on the minimum number of tuples that the partition buffer is configured to store before writing out the partition buffer contents to a corresponding partition space in slow access memory. In an embodiment, the maximum fan-out of a data set of tuples is calculated based on a partition buffer storing at most a single tuple. In other embodiments, to minimize the number of rounds of write-outs, a higher pre-configured number may be used as the maximum number of tuples in a partition buffer.

For example, an operand data set of a partition operation may have an average tuple size of 1 KB. A processing unit may at most allocate 800 KB of fast access memory to partition buffers, each partition buffer configured to store at least 100 tuples. The maximum fan-out is determined by dividing the allocated fast access memory by the total size of tuples configured to be stored in a partition buffer, 800/(100*1)=8. Thus, for example, to distribute tuples of the data set into the target number of 64 partitions, each processing unit can first partition tuples into at most 8 partitions in the first iteration, and each of those 8 partitions can be further partitioned into another 8 partitions in the next iteration to yield a desired total of 64 partitions. In this example, if cDBMS 100 were to partition the tuples into 16 partitions in the first iteration and then 4 partitions in the next iteration, then one or more processing units of cDBMS 100 may experience an overflow of partition buffers in the first iteration because 16 partitions exceeds the maximum of 8 fan-out determined by cDBMS 100 for the data set.

Target Number of Partitions

In an embodiment, a target number of partitions for a data set is a non-power of two number in order to better utilize fast access memory available to each processing units and/or to spread the load of performing partition and partition based operation evenly across the processing units of cDBMS 100. For example, cDBMS 100 may consist of 24 database server nodes, each server node containing 2 processors with 2 cores. Thus, for this example, the number of processing units in cDBMS 100 is 96. With power-of-two partitioning, a data set can be partitioned to the closest power-of-two number of partitions, 64 or 128 partitions. If a data set were partitioned in 64 partitions, then the subsequent group-by or join operation would be able to utilize only 64 processing units with 32 processing units idling. Meanwhile, if a data set is partitioned in 128 partitions, then the subsequent group-by or join operation would have to be performed with 64 processing units performing the operation on a single partition, while 32 processing units performing the operation on 2 partitions. Furthermore, if the maximum fan-out for the data set is above 96 but is below 128, then the partition operation itself needs two iterations to achieve 128 partitions.

Figure 2A:
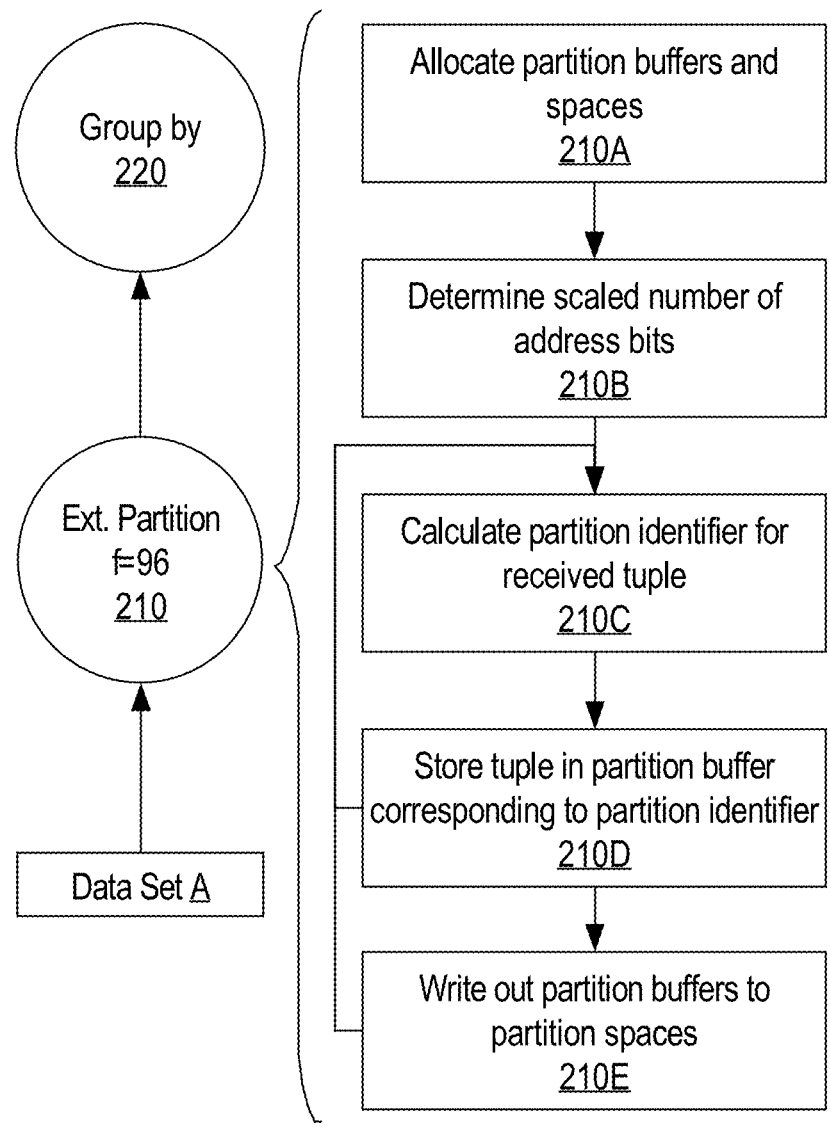
FIG. 2A is a flow diagram depicting a portion of execution plan for extended partitioning, in an embodiment.

On the other hand, for this example, cDBMS 100 may use extended hash partitioning to partition the data set into 96, non-power-of-two, partitions in one iteration and may spread the 96 partitions evenly among the 96 processing units (a single partition each) for the subsequent operation. FIG. 2A is a flow diagram depicting a portion of execution plan for extended partitioning, in an embodiment. cDBMS 100 that contains 96 processing units performs an extended hash partitioning on data set A at block 210. For each of the 96 resulting partitions from block 210, the corresponding processing unit of the 96 processing units performs a group-by operation on the partition at block 220 in parallel with other processing units. Since each process unit performs the group-by operation on a single partition, the group-by operation at block 220 is performed perhaps as many as 96 times faster than without partitioning data set A. Such processing is also faster (perhaps multiple factors faster) than if any processing unit of cDBMS 100 were forced to perform the group-by operation on two partitions because of power-of-two partitioning for non-power-of-two number processing units. Therefore, having the target number of partitions equal to the number of processing units in cDBMS 100 may increase the performance of the operation subsequent to the partition operation.

Additionally or alternatively, the number of target partitions may depend on the size of fast access memory available for each processing unit and the size(s) of data set(s) of a partition operation. To optimize the performance of the subsequent operation that uses the partitions from a partition operation, each generated partition has to fit within the fast access memory of a processing unit. In the case of the subsequent operation involving more than one data sets, respective partitions from each data set have to fit in the fast access memory. Consequently, if partition(s) necessary for the subsequent operation can be fully loaded within fast access memory of a processing unit, cDBMS 100 performs the subsequent operation without the need for accessing slower access memory. Such performance of the subsequent operation considerably speeds the parallel execution of the subsequent operation by cDBMS 100.

cDBMS 100 may determine the target number of partitions by dividing the total size of data set(s) by the size of fast access memory. If more than one data set is used for the subsequent operation, the sum of the data sets' sizes may be used for the determination of the target number of partitions for the partition operation. For example, if cDBMS 100 with core cache size of 512 KB performs a partition operation for a join operation of 16 MB data set A and 20 MB data set B, the target number of partitions can be calculated by adding the sizes of data set A and data set B and dividing by the fast access memory size of a single processing unit:

$$(16\ MB + 20\ MB)/512\ KB = 72.$$

In a related embodiment, cDBMS 100 compares the target number of partitions based on number of processing units and the target number of partitions based on fast access memory of a processing unit to select the target number of partitions for the partition operation. For example, cDBMS 100 may select the maximum of the determined target number of partitions to ensure that the selected number of partitions results in maximum parallel execution of the subsequent operation while avoiding access to slower access memory. The selected target number of partitions may be a non-power of two number.

Non-Power-of-Two Partitioning

To partition a data set into a non-power-of-two number of partitions, cDBMS 100 may use modulo partitioning, in an embodiment. Each partition hash of the data set is divided by the number of partitions and the resulting remainder is used as a partition identifier for the partition of the tuple. However, since modulo-based partitioning is not based on address bits of the partition hash while hash partitioning is, combining modulo partitioning in one iteration with hash partitioning in another iteration may fail to generate "symmetrical partition identifiers" for multiple data sets as described below. Particularly combining modulo partitioning with hash partitioning fails when number of partitions amongst multiple-iterations vary between multiple data sets.

For example, partitioning a data set into 4 partitions with hash partitioning, and then, partitioning each of the 4 partitions with modulo-based partitions into 3 partitions yields total of 12 partitions. However, these 12 partitions would have different partition identifiers, if the same data set were to be first partitioned into 2 partitions using hash partitioning, and then, each of the 2 partitions were to be partitioned into 6 partitions to yield the same total of 12 partitions. Therefore, multiple data sets that are to be joined based on partitioning, have to have at least the same exact number of partitions in the modulo-based partitioning iteration. Such constraint can lead to under-utilization of resources during the partitioning operation as it reduces the flexibility of matching a data set with computer resources available for partitioning.

In an embodiment in which a data set is to be partitioned into non-power-of-two number of partitions, cDBMS 100 may use extended hash partitioning for distributing tuples based on respective partition hashes into the non-power-of-two partitions. cDBMS 100 may calculate partition identifiers from respective partition hashes based on a pre-determined scaling constant, the determined number of address bits to select in a partition hash and the value of selected address bits in the partition hash.

In an embodiment, cDBMS 100 selects significantly more number of address bits from a partition hash than necessary to generate closest power-of-two number of partitions. To do so, the non-power-of-two partition number may be scaled upwards by a constant. The number of partition address bits necessary for the closest power-of-two-number that exceeds the scaled non-power of two number, is selected. This selected number represents the scaled up number of address bits for cDBMS to use for determining non-power-of-two partition identifier.

In an embodiment, scaled up number of address bits, k, is determined using the following formula:

$$2^k \geq N*p$$

where N is a scaling constant and p is a desired non-power-two number of partitions. The scaling constant may be experimentally determined for the hashing algorithm used to convert partition key values into partition hashes. In an embodiment, the scaling constant is experimentally selected to be anywhere in the range from 10 to 40 and in some embodiments, from 20 to 30. The scaling factor may determine the skew of how un-evenly tuples of the data set are to be distributed into partitions with the generated partition identifiers. The greater is the scaling factor, the less skew the distribution generates. In one embodiment, the skew will be at most 1/N for the data set.

In an embodiment, the non-power-of-two partition identifier, p(v) is calculated using the following formula:

$$p(v)=(v(k)*p)>>k$$

where value of selected k address bits, v(k), is multiplied by a desired non-power-two number of partitions, p, and then right shifted by the number of address bits, k, to determine the non-power-of two partition identifier, p(v).

Using the techniques described above, a processing unit of cDBMS 100 may calculate a partition identifier for each received tuple from a partition hash generated from the corresponding partition key value. The tuple is then distributed to a partition buffer of the processing unit that corresponds to the calculated partition identifier. After all tuples have been processed for such partitioning, the processing units of cDBMS 100 generate non-number-of-two partition spaces, each corresponding to a unique partition identifier calculated using the techniques above.

Continuing with the FIG. 2A example, once the target number, 96, partition have been allocated at block 210A in the extended partitioning step at block 210, cDBMS 100 determines the scaled number of address bits to use for partition hashes of data set A at block 210B. For 96 target partitions and the scaling constant of 25, the scaled number of address bits is calculated using the following expression:

$$\text{roundup}(\log_2(25*96))=12.$$

At block 210C, for each received tuple, cDBMS 100 calculates the partition identifier based on multiplying the 12 most significant bits of the tuple partitions hash with required number of partitions, 96 and right shifting the product 12 times. This leads to dividing range of values of these 12 bits, [0, 4095], into 96 almost equal parts each including 42 or 43 values. At block 210D, cDBMS 100 stores the tuple into the partition buffer corresponding to the calculated partition identifier. At block 210E, the partition buffers on fast access memory are written out to the corresponding partition spaces in slower access memory.

Multi-Iteration Partitioning

In an embodiment, if the number of target partitions exceeds the maximum fan-out of a data set for cDBMS 100, then the partition operation may include multiple iterations. If the number of target partitions is determined to be a non-power-of-two number, then at least in one of the multiple iterations, cDBMS 100 partitions tuples into a non-power-of-two number of partitions.

cDBMS 100 may not recalculate partition hashes for tuples already partitioned in a previous iteration. In an embodiment, the previous iteration of partitioning stores partition hashes with the corresponding tuples in the partition spaces, and thus, cDBMS 100 may re-use partition hashes for received tuples without re-generating them. In another embodiment, to save storage space, the partition hashes from the previous iteration are not saved and are re-generated from partition key values of tuples at each iteration. This iteration of partitioning may be preceded or followed by an iteration in which cDBMS 100 partitions tuples in a power-of-two number of partitions.

In an embodiment, in which the iteration for partitioning into a non-power-of-two number of partitions is followed by partitioning into a power-of-two number of partitions, cDBMS 100 may select the next most significant bits after the scaled address bits of a partition hash as the address bits for the power-of-two partitioning. Partition identifier for a tuple after the power-of-two partitioning iteration contains the non-power-of-two partition identifier followed by the power-of-two partition identifier, both calculated from a partition hash of the tuple.

Similarly, for an embodiment, in which the iteration for partitioning into a non-power-of-two number of partitions is preceded by partitioning into a power-of-two number of partitions, cDBMS 100 may select the next most significant bits after the power-of-two address bits of a partition hash as the scaled address bits of the non-power-of-two number of partitions. Partition identifier for a tuple after the non-power-of-two partitioning iteration contains the power-of-two partition identifier followed by the non-power-of-two partition identifier, both calculated from a partition hash of the tuple.

In an embodiment, the final partition identifier after $i^{th}$ iterations of partitioning (either power-of-two or non-powerof-two), $P_i(v)$, global partition identifier, is calculated using the following recursive formula:

$$P_i(v)=P_{i-1}(v)*p_i+p_i(v)$$

where $P_0(v)=0$, $p_i$ is number of partitions in $i^{th}$ iteration and:

$$p_i(v) = \begin{cases} v(k_i); & \text{if } p_i \text{ is power of two} \\ (v(k_i)*p_i) \gg k_i; & \text{else} \end{cases}$$

where $v(k_i)$ is the value of selected $k_i$ address bits in $i^{th}$ iteration.

As an example, to create 24 target partitions with maximum fan-out 4, one solution would be 3 rounds of partitioning creating $p_1=4$, $p_2=3$ and $p_3=2$ number of partitions using $k_1=2$, $k_2=7$, and $k_3=1$ number of bits respectively. In this partitioning scheme, for example, the above equation may be used to determine that data value 919 (0b1110010111) is distributed to partition 21. The data value is partitioned in 3 rounds with $v(k_1)=3$, $v(k_2)=75$, and $v(k_3)=1$. Global partition identifier is then calculated as:

$$P_3(919)=[3*3+((75*3)\gg 7)]*2+1=21$$

Figure 2B:
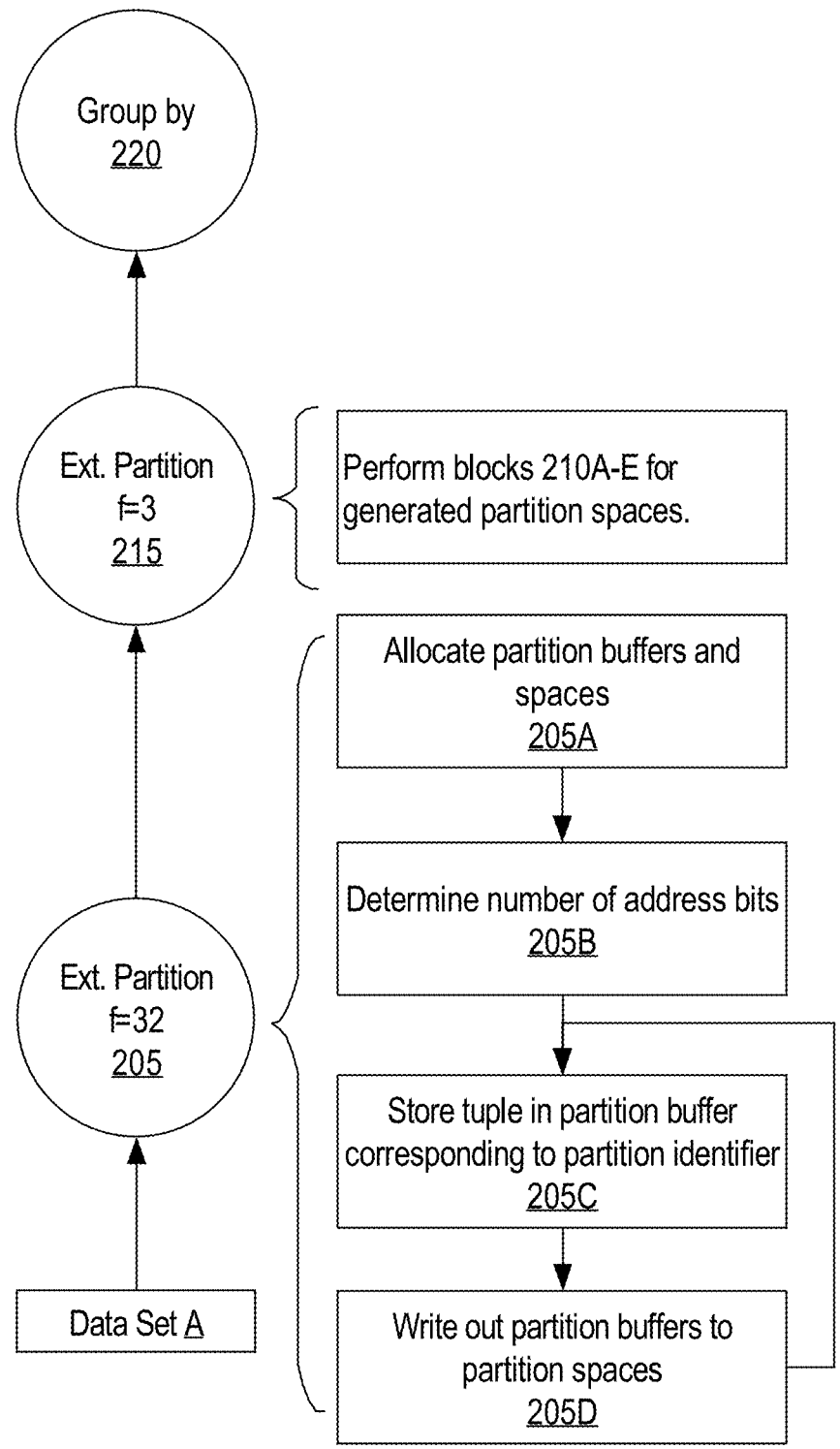
FIG. 2B is a flow diagram depicting a portion of execution plan for a group-by operation performed in two iterations, in an embodiment.

Continuing with the example of partitioning data set A in FIG. 2A, FIG. 2B is a flow diagram depicting a portion of execution plan for a group-by operation performed in two iterations, in an embodiment. For example, data set A may have maximum fan-out of 35 partitions per iterations. Thus, for efficient partitioning of data set A into 96 target partitions, cDBMS 100 may determine to partition data set A into 32 partitions using power-of-two partitioning at block 205 and then partition each of the resulting partitions into 3 partitions using extended (non-power-of-two) partitioning at block 215.

To partition data set A into 32 partitions, at block 205A, each processing unit executing partition operation allocates 32 partition buffers in its accessible fast access memory. Total of 32 partition spaces are also allocated in slow access memory shared amongst the processing units of cDMBS 100. At block 205B, cDBMS 100 determines the number of bits to use for partitioning. Since data set A is to be partitioned into 32 partitions, 5-bit partition identifier can identify each of the 32 partitions. cDBMS 100 may select the most significant 5 bits of a partition hash as the address bits for distributing tuples. As stream of tuples is received, each processing unit of cDBMS 100 generates a partition hash for a received tuple and based on the partition identifier, particularly the most significant 5 bits of the partition hash, the processing unit stores the tuple into the corresponding partition buffer at block 205C. After one or more rounds of write outs of partition buffers into corresponding partition spaces in shared memory at block 210D, data set A is partitioned into 32 partition spaces in the first iteration at block 205.

At block 215, as part of the second iteration, cDBMS 100 reads tuples from partition spaces and further partitions each of the partition spaces using extended partitioning described in blocks 210A-E of FIG. 2A, in an embodiment. In particular, at block 210B of FIG. 2A, cDBMS 100 determines scaled number of address bits for a tuple such that the new partition identifier does not use any of the bits in the partition hash that have already been used for the partition identifier in the previous iteration. For example, if the first most significant number of bits of the partition hash of a tuple has been already used in the previous iteration, cDBMS 100 uses the next number of most significant bits for the current iteration of partitioning.

In this example, for extended partitioning into 3 partitions with scaling constant of 25, the extended partitioning is calculated to use 7 scaled address bits for determining the partition identifier from partition hashes. Since the previous iteration has already used the first 5 most significant bits for power-of-two hash partitioning, cDBMS 100 uses the next 7 bits of partition hashes of tuples to calculate the current iteration's partition identifier for the tuple at block 210C.

The newly calculated partition identifier from the current iteration may be appended to the partition identifier from the previous iteration to yield the new partition identifier for a tuple. In an embodiment, in the next iteration of partition operation, cDBMS 100 partitions tuples one partition space at a time. Stated differently, processing units of cDBMS 100 do not commingle tuples from multiple partition spaces of the previous iteration. Rather, a processing unit of cDBMS 100 continues on to the next partition space only after completing the partition operation on tuples from the current partition space. With such technique, although, the total number of partitions (and partition identifiers) may exceed the maximum fan-out of the data set in an iteration, since each processing unit is partitioning one partition space at a time, the partition buffers never exceed the number of partitions in the current round. Stated differently, no processing unit of cDBMS 100 would need to create more partition buffers than the number of partitions determined in that iterations.

Continuing with the above example, a processing unit would receive tuples from a single partition space of the 32 partition spaces generated in the previous iteration for data set A. The processing unit allocates and maintains 3 partition buffers, rather than up to 96 partition buffers, to distribute the tuples from the partition space into. Each partition buffer may correspond to a new partition identifier generated based on the partition identifier of the originating partition space and the newly calculated partition identifier. The processing unit performs a write-out of the 3 partition buffers to new partition spaces identified with the new partition identifiers when either one of the three partition buffers are full or all tuples have been read out of the originating partition space. Once all the tuples from the partition spaces from the previous iteration have been processed, cDBMS 100's shared memory will contain the target number of 96 new partition spaces. At block 220, processing units of cDBMS 100 may perform a group-by operation on tuples from each corresponding partition space in parallel.

Symmetry of Partitions

In an embodiment, multiple data sets may be partitioned for a subsequent operation for which the multiple data sets are partitioned. A processing unit of cDBMS 100 loads at least one partition from each of the multiple data sets to perform the subsequent operation. The loaded partitions need to have the same symmetrical partition identifiers for the processing unit to accurately perform the subsequent operation.

The term "symmetrical partition identifiers" for multiple data sets refers to the partition identifiers of corresponding partitions of the multiple data sets that have partition key values from the same set of values. A particular partition and the corresponding partition from different data sets are identified with a symmetrical partition identifier, when these partitions include partition key values from a unique set of partition key values that do not exist in any other partition of the data sets.

Symmetrical partition identifiers may be generated when corresponding partitions of multiple data sets are generated the same way, i.e. using the same hashing algorithm to generate partition hashes from the tuples of the multiple data sets and using the same or similar partitioning algorithm to partition the tuples based on the partition hashes. Stated differently, the same way of partitioning multiple data set causes each partition with a unique partition identifier to have a unique set of possible partition hashes and thus partition key values. This ensures that the subsequent operation can be individually performed on partitions of the multiple datasets with same partition identifiers, and the results from these operations can be aggregated to yield the accurate result of the subsequent operation on the multiple data sets.

Figure 3A:
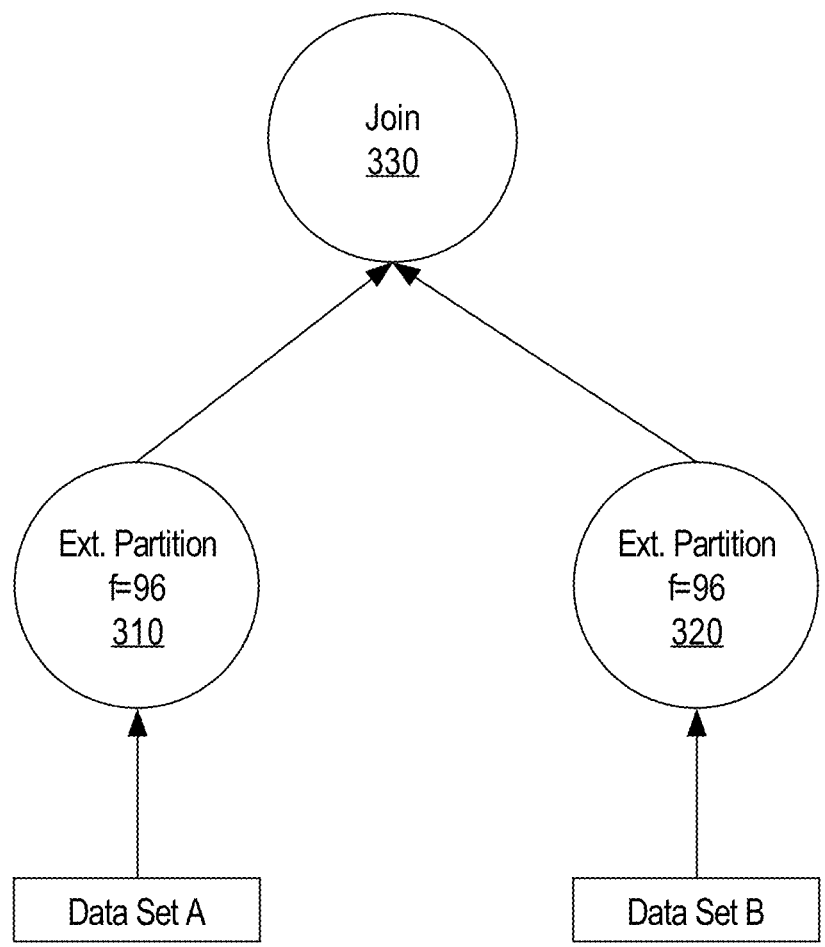
FIG. 3A is a flow diagram depicting a portion of execution plan for extended partitioning for a join operation, in an embodiment.

For example, FIG. 3A is a flow diagram depicting a portion of execution plan for extended partitioning for a join operation, in an embodiment. At blocks 310 and 320, data sets A and B are respectively partitioned using extended hash partitioning with a target number of 96 partitions. In order to guarantee symmetry of partition identifiers, the same hash algorithm, such as CRC32, is used to generate partition hashes of partition key values from data sets A and B. Since the same hash algorithm is used on the tuples from both data sets A and B, if a partition hash of a tuple from data set A does not match a partition hash from data set B, then the corresponding partition key values indeed also fail to match. Consequently, if partition hashes of each data set are divided into sets (i.e. partitions) based on a partition identifier from the same portion of partition hashes, partition key values corresponding to the partition hashes that belong to sets with different partition identifiers will not match. Indeed, only partition hashes from a set identified with the same partition identifier may have the same partition key hash values.

In an embodiment, the extended partitioning of multiple data sets involved in the subsequent operation are partitioned to yield symmetrical partition identifiers. In particular, the extended partitioning of the multiple data sets uses the same hash algorithm and the same scaling constant. Continuing with the above example, if the same scaling constant is used in calculations of partition identifiers for both data set A and data set B, the partition identifiers of data set A are symmetrical with the partition identifiers of data set B. The partition key values from the partition of data set A with partition identifier 0 can be joined at block 220 with the partition key values from the partition of data set B with partition identifier 0 to produce an accurate joined data set of tuples for a distinct set of partition key values. At block 220, once all the corresponding partitions are joined, the aggregate of the results from this joining is the accurate result of the join operation of data set A with data set B.

In an embodiment, the symmetry of partition identifiers for multiple data sets may persist even if different partitioning techniques are used at different iterations. If the same partitioning technique is used at the last iteration to produce a same target number of partitions for the multiple data sets, the partition identifiers for each data set may be generated to be symmetrical. Since, extended hash partitioning is based on hash partitioning, any number of iterations of power-of-two hash partitioning may precede the extended partitioning iteration without affecting the symmetry of partition identifiers of multiple data sets.

Figure 3B:
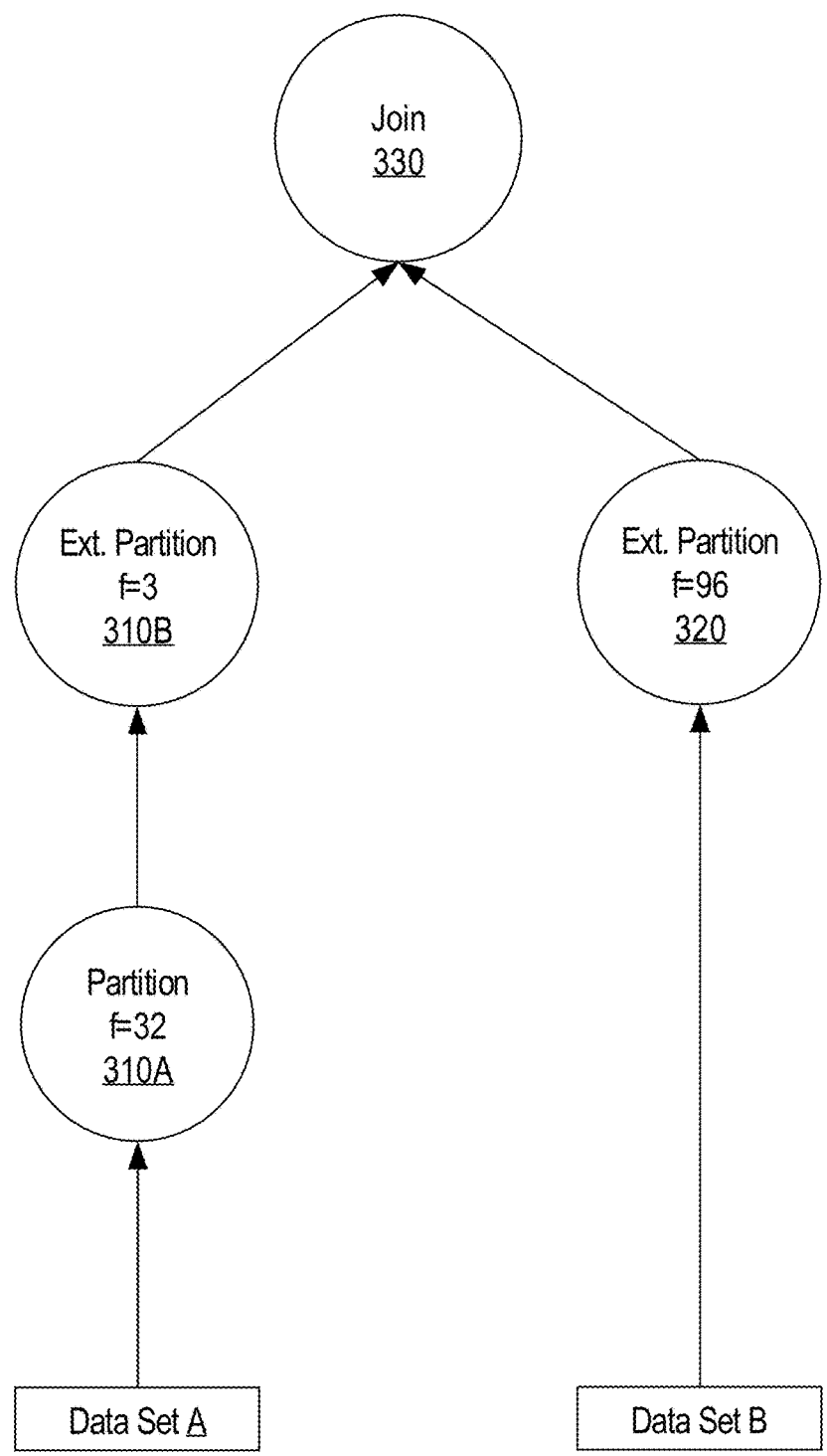
FIG. 3B is a flow diagram depicting a portion of execution plan with different partitioning in different iterations for a join operation, in an embodiment.

For example, FIG. 3B is a flow diagram depicting a portion of execution plan with different partitioning in different iterations for a join operation, in an embodiment. Data set B, similar to FIG. 3A, is partitioned in a single iteration into 96 partitions using extended partitioning. As discussed above for 96 partitions partitioning, at block 320, each partition identifier for data set B is determined by selecting 12 bits from a partition hash, by scaling the bits by a scaling factor, and then, by right shifting 12 times.

For data set A, as depicted in the portion of execution plan in FIG. 3B, in the first iteration, as discussed above for FIG. 2B, 5 bits of a partition hash are used as a partition identifier at block 310A for power-of-two partitioning of 32 partitions. In the next iteration, at block 310B, as discussed above for extended partition of 3 partitions described for FIG. 2B, the next 7 bits are scaled by the same scaling constant and right shifted 7 times. Thus, for data set A, cDBMS 100 also uses 5+7=12 address bits of a partition hash to determine a partition identifier. Since both data set A and data set B use 12 bits of partition hashes generated by the same hash algorithm and since the last iterations of both data sets uses the same methodology to partition, extended partitioning with the same scaling constant, the partition identifiers generated at block 310B for data set A are symmetrical with partition identifiers generated at block 320 for data set B. Therefore, at block 330, each corresponding partition from data sets A and B may be joined in parallel, and the aggregated results of the join operations yield an accurate result of join operation for data sets A and B.

While the symmetry of partition schemes for multiple data sets may be preserved by applying the same schemes for all the data sets, in an embodiment, the common scheme is generated by considering the worst constraint from one of the data sets (using the minimum of the maximum fan-outs of the data sets). Therefore, not all of the datasets may suffer from the constraint of asymmetry.

Alternatively, preserving the symmetry property for partition schemes of multiple data sets may be necessary. For example, two partition schemes are symmetric, when the partition schemes' global partition identifiers are equal. The equality may be achieved when their respective base partition schemes are the same, in which the base partition scheme is generated by determining each iteration in a partition scheme with target $p_i$ partitions by converting $p_i$ to $(2*p_i/2)$ while 2 is a factor of $p_i$. For example for a partition scheme {4, 6, 7, 3, 2, 2}, the base partition scheme is {2, 2, 2, 3, 7, 3, 2, 2}. Accordingly, the partition schemes may be generated by combining all iterations with power-of-two partition before one non-power-of-two iteration because such combining of the iterations generates the same global partition identifier. On the other hand, a non-power-of-two iteration may not be combined with anything after that (neither power-of-two nor non-power-of-two) because the global partition identifiers for the multiple data sets may not match. This symmetric property is used in the next section to improve the partition scheme of multiple data sets.

Generating Partition Schemes

Since cDBMS 100 may interchangeably use extended partitioning techniques with power-of-two partitioning in different iterations of a partition operation on a data set, many permutations of partition schemes are possible for the partition operation to achieve the same target number of partitions. For example, data set A in FIG. 3B may be partitioned in as many different ways as there are multiplicands for the target number of 96 partitions. One possible partition scheme would be two iterations of 8 and 12 partitions respectively, and another possible partition scheme would be three iterations of 8, 4 and 3 partitions respectively.

However, there may be significant number of partition schemes that could potentially partition data set(s) for the subsequent operation. Iterating through all possible partition schemes to select a particular partition scheme for the partition operation may consume significant computational resources of cDBMS 100. Therefore, cDBMS 100 may limit the number of partitions schemes generated in order to save resources for selecting a particular partition scheme.

In an embodiment, cDBMS 100 generates multiple partition schemes based on the maximum fan-outs of one or more data sets per iteration of partitioning. For multiple data sets, the maximum fan-out for an iteration rather than a dataset may be determined by taking the minimum of the maximum fan-outs of the multiple data sets. Using this maximum fan-out per iteration and the target number of partitions, cDBMS 100 may determine multiple combinations of a possible number of partitions for each iteration. Each of these combinations is a partition scheme that indicates different number of iterations and/or a different number of partitions in an iteration.

Figure 4:
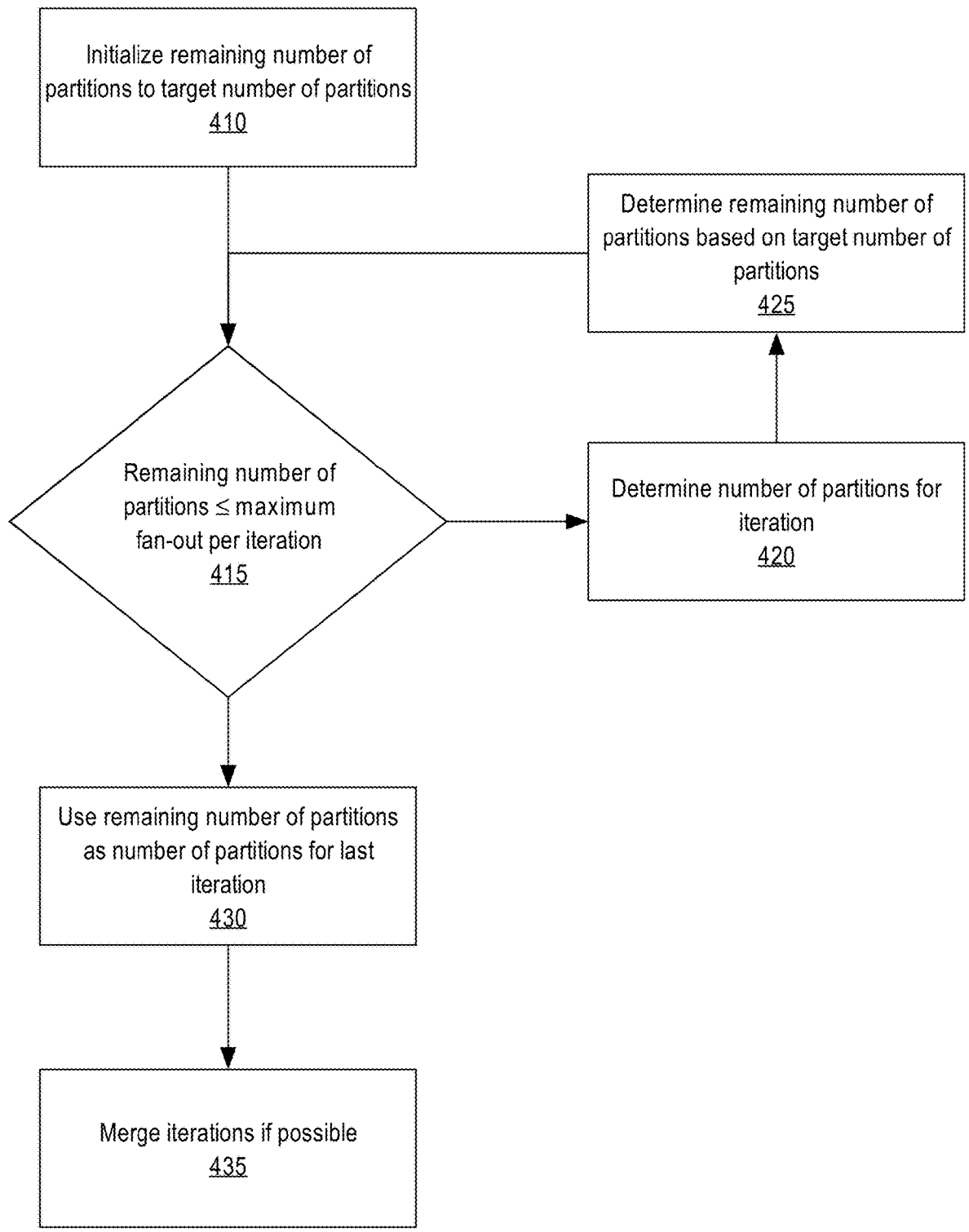
FIG. 4 is a flow diagram to generate multiple partition schemes for a partition operation in an embodiment.

FIG. 4 is a flow diagram to generate multiple partition schemes for a partition operation in an embodiment. At block 410, the number of partitions remaining to be apportioned among iterations of partition operation, remaining number of partitions, is initialized to a target number of partitions for the partition operation. The remaining number of partitions is used by cDBMS 100 to determine when to conclude creating another iteration for a given partition scheme. For that purpose, at block 415, the remaining number of partitions is compared with a maximum fan-out per iteration for the data set(s) in the partition operation. If the partition operation is for a single data set, then the maximum fan-out of the single data set may be used as the maximum fan-out of the iteration. Otherwise, if the partition operation is for multiple data sets, the minimum of the maximum fan-outs of the multiple data set may be used as the maximum fan-out per iteration.

If, at the first evaluation of block 415, the remaining number of partitions, i.e. the target number of partitions, is less than or equal to the maximum fan-out per iteration, then a single iteration partition scheme may be generated at block 430 comprising of the target number of partitions. No modification to such a partition scheme may be necessary at block 435. cDBMS 100 may select this single iteration partition scheme for the partition operation.

On the other hand, if, at block 415, the remaining number of partitions is greater than the maximum fan-out per iteration, then the process transition to block 420 to determine the number of partitions for that iteration.

At block 420, cDBMS 100 may determine multiple partition numbers for a given iteration of the partition operation, each corresponding to a different partition scheme. Different partition scheme generation techniques for determining the number of partitions for the current iteration are discussed below.

At block 425, the remaining numbers of partitions for next iterations are determined for the different partition schemes based on the corresponding number of partitions for a partition scheme in the current iteration and the target number of partitions for the partition operation. In one embodiment, the remaining number of partitions for next iteration(s) is determined by dividing the remaining number of partitions (which is the target number of partitions in the first iteration) by the number of partitions determined for that iteration at block 420. The ceiling/round-up of the quotient yields the remaining number of partitions for the next iteration(s).

The blocks 415-425 may be repeated for as many iterations as necessary for each of the different partition schemes to determine the partition number for each iteration other than the last iteration of the partition scheme. For the last iteration, at block 430, the remaining number of partitions, which should be evaluated to be less than the maximum fan-out per iteration at block 415, may be selected for each partition scheme.

According to one partition scheme generation technique, at block 420, cDBMS 100 determines a partition number for the iteration based on preference for the power-of-two partitioning. Such a partition scheme may yield a resource-efficient partition operation because the power-of-two partitioning requires less calculations during a partition operation to determine partition identifiers than extended partitioning.

In one such embodiment, cDBMS 100 determines the partition number for that iteration to be the maximum power-of-two factor/multiplicand of the remaining number of partitions that does not exceed the maximum fan-out per iteration. For example, for data set A with a maximum fan-out of 10 per iteration and a partition operation with a target number of 120 partitions, cDBMS 100 determines the number of partitions for each iteration at block 420. For the first iteration, cDBMS 100 determines the partition number to be 8 because 8 is the maximum power-of-two number that does not exceed the maximum fan-out per iteration, 10. At block 425, the number for remaining partitions is determined by dividing the target number of partitions by the first partition iteration number of 8 and taking a ceiling (rounding up) of the quotient to yield 15. The remaining number of partitions, 15 still exceeds the maximum fan-out per iteration and thus, a partition number for another iteration is calculated at block 420. Since the remaining number of partitions, 15, has no multiplicand/factor that is of power-of-two, other than 1, cDBMS 100 determines the second partition number to be the maximum fan-out per iteration, 10. At block 425, the remaining number of partitions is determined by dividing, the remaining number of partition, 15, by 10 and rounding the quotient, of 1.5 up (or applying ceiling function) to yield 2. At the next iteration, at block 425, cDBMS 100 evaluates the remaining number of partitions, 2, to be less than the maximum fan-out per iteration. Accordingly, the process transitions to block 430, where the last iteration is assigned to the remaining number of 2 partitions. Thus, the partition scheme for data set A with maximum fan-out of 10 partitions and target number of 120 partitions, includes 8 partitions in one iteration, 10 further partitions in another iteration, and 2 partitions in yet another iteration, resulting in total of 160 partitions. For cDBMS 100 with 120 processing units, the resulting 160 partitions would result in load imbalance of 40 processing units performing the subsequent operation twice.

In an embodiment, load imbalance of a partition scheme is represented by a metric. The term "imbalance metric" refers herein to a numerical representation of load imbalance for a partition scheme as a result of mismatch of total or per iteration number of partitions and the resources available to cDBMS 100 to execute the partition operation or the operation subsequent to the partition operation. In one embodiment, the imbalance metric is based on the resulting number of partitions for a partition scheme and the number of processing units of cDMBS 100. In such an embodiment, the imbalance metric may be described using the following equation:

$$r = \frac{\text{ceiling}\left(\frac{p'}{p}\right)}{\frac{p'}{p}}$$

in which r is load imbalance metric and is equal to ceiling of a ratio of the partition scheme's resulting number of partitions, p', over the target number of partitions, p, divided by a ratio of the resulting number of partitions, p', over the target number of partitions, p. For example, the load imbalance metric according to this embodiment for the above example of data set A with a target partition number of 120 and the resulting number of partitions 160, is equal to 1.5.

According to another partition scheme generation technique, at block 420, cDBMS 100 determines a partition number for the iteration at hand based on preference for minimizing any load imbalance by greater utilization of extended partitioning. Using extended partitioning, cDBMS 100 can perform a partition operation with a partition scheme that closer matches the target partition number and thus, better utilizes the computational resources of cDBMS 100 for the subsequent operation.

In an embodiment, cDBMS 100 determines the partition number for that iteration to be the maximum factor/multiplicand of the remaining number of partitions that does not exceed the maximum fan-out per iteration. Since the technique may utilize extended partitioning, the maximum factor/multiplicand need not be a power-of-two number.

Continuing with the example for data set A with a maximum fan-out of 10 per iteration and a partition operation with a target number of 120 partitions, cDBMS 100 determines the number of partitions for each but last iteration at block 420. For the first iteration, cDBMS 100 determines the partition number to be 10 because the number 10 is the maximum factor/multiplicand of the target number of 120 partitions that does not exceed the maximum fan-out per iteration, which is 10 as well. At block 425, the number for remaining partitions is determined by dividing the target number of partitions by the first partition iteration number of 10 and taking a ceiling (rounding up) of the quotient to yield 12. The remaining number of partitions, 12, still exceeds the maximum fan-out per iteration, 10, at block 415. Thus, a partition number for another iteration is calculated at block 420. cDBMS 100 determines the second partition number to be 6 because the number 6 is the maximum factor/multiplicand of the remaining number of partitions, 12, that does not exceed the maximum fan-out per iteration, 10. At block 425, the remaining number of partitions is determined by dividing, the remaining number of partitions, 12, by 6 and rounding up the quotient of 2 (or applying ceiling function) to yield 2. At the next iteration, at block 415, cDBMS 100 evaluates the remaining number of partitions, 2, to be less than the maximum fan-out per iteration. Accordingly, the process transitions to block 430, at which the last iteration is assigned to the remaining number of 2 partitions. Thus, the generated partition scheme for data set A with a maximum fan-out of 10 partitions and target number of 120 partitions includes three iterations, an iteration of 10 partitions, another iteration of 6 partitions, and yet another iteration of 2 partitions, resulting in total of 120 partitions. For cDBMS 100 with 120 processing units, the resulting 120 partitions would result in balanced load across the processing units.

Continuing with FIG. 4, at block 435, cDBMS 100 may optimize each partition scheme by attempting to merge partition iterations to eliminate an iteration from a partition scheme. In an embodiment, an iteration is merged with one or more other iterations in a partition scheme, when the number of partitions in the iteration is factorized and all the factors/multiplicands of this number are multiplied to the number of partitions in the other iterations to generate a new partition scheme. Accordingly, an iteration is eliminated in the generated new partition scheme by the number of partitions of the iteration being merged into one or more other partitions.

For example, partition scheme A[1 . . . n] including n iterations may be reduced to B[1 . . . m] including m iterations where m≤n. The following pseudo code illustrates how scheme A can be converted to scheme B, where f(B) is maximum fan-out in this data set. This example pseudocode preserves the base partitioning scheme of A and B equal and thus A and B are symmetric.

```
Merge (A[1..n] , f(B) ) {
    for ( i = 1 to n)
        B[i] = 1;
    j = 1;
    for ( i = 1 to n) {
        C = A[i];
        while ( C % 2 = 0){
            if ( B[j] * 2 > f(B))
                j++;
            B[j] *= 2;
            C /= 2;
        }
        if (C != 1){
            if ( B[j] * C > f(B) )
                j++;
            B[j] *= C;
            if (j < n)
                j++;
        }
    }
    return B[1..j];
}
```

In an embodiment, merging may be used for a partition scheme that is generated for multiple data sets co-operated in a subsequent operation. As discussed above, for multiple data sets, the maximum fan-out per iteration for generation of a partition scheme is determined based on the minimum fan-out of the respective fan-outs of the multiple data sets. Thus, a particular data set of the multiple data sets may have actually much greater maximum fan-out per iteration than the number of partitions in iterations of the generated partition schemes.

Therefore, a new partition scheme may be generated for a data set when the number of partitions in a newly merged iteration(s) does not exceed the maximum fan-out for the data set but possibly exceeds the maximum fan-out per-iteration for the partition operation.

For example, data set A from the previous examples is partitioned to be joined with data set B. From the previous examples, data set A has a maximum fan-out of 10 partitions, while data set B has a maximum fan-out of 20 partitions. Both data sets A and B are partitioned for target number of 120 partitions for parallel execution of the subsequent join operation. For generating partition schemes for data sets A and B, cDBMS 100 may use the minimum of the maximum fan-out of 10 for data set A and of the maximum fan-out of 20 for data set B.

As described in the previous examples, one partition scheme, generated with such parameters, may yield three iterations with 10 partitions, 6 partitions and 2 partitions for both data sets. Based on the above describe algorithm, this scheme cannot be improved further for data set B (The output of the above pseudo code is the same as input). However, for partition scheme with iterations 2 partitions, 6 partitions and 10 partitions, the improved scheme for data set B would be scheme with one less iterations (2 instead of 3) with 12 partitions and 10 partitions.

The approaches described herein are not limited to partition scheme generation techniques, such as merging, described above. Other techniques for generating partition schemes are also envisioned by the approaches, and those partition schemes may be used in techniques for selecting a particular partition scheme for a partition operation.

For example, cDBMS 100 may generate a single iteration partition scheme with the partition number based solely on the power-of-two partitioning. cDBMS 100 determines the number of partitions in the iteration based on the power-of-two number which is closest but yet exceeds the target number of partitions. Such a partition scheme disregards the maximum fan-out per iteration and may result in multiple accesses to slower access memory during the partition operation, slowing down the partition operation. Additionally, this partition generation technique may introduce load imbalance of partitions in the subsequent operation. The technique minimizes the number of partition iterations and uses only the more efficient power-of-two partitioning.

For example, cDBMS 100 may generate a single partition iteration scheme for data set A which from the previous examples has a maximum fan-out of 10 per iteration for a target number of 120 partitions. For the single iteration partition scheme of data set A, cDBMS 100 determines the number of partitions to be 128, the next power-of-two number that exceeds 120.

This and other examples for partition schemes of data sets A and B are summarized below. For data set A with a maximum fan-out of 10 partitions and for a target number of 120 partitions, the following partition schemes are generated by cDBMS 100 for data set A in the examples:
  first partition scheme of three iterations with 8 partitions in one iteration, 10 further partitions in another iteration, and 2 partitions in yet another iteration, resulting in total of 160 partitions;
  second partition scheme of three iterations with 10 partitions in one iteration, 6 partitions in another iteration, and 2 partitions in yet another iteration, resulting in total of 120 partitions;
  third partition scheme of a single iteration with 128 partitions in one iteration, resulting in total of 128 partitions.

For data set B when operated with data set A in a subsequent operation, each partition scheme generated for data set A may be improved by merging process by preserving the symmetry property of partitioning schemes for A and B. Based on techniques described below, cDBMS 100 may select a particular partition scheme for data sets A and B for their respective partition operations.

Selecting Optimal Partition Scheme

In an embodiment, from generated partition schemes, cDBMS 100 selects the most optimal partition scheme using one or more optimization policies. cDBMS 100 may select partition schemes by eliminating partition schemes that are determined, in comparison with other(s), to yield less accurate results for the subsequent operation. cDBMS 100 may also eliminate partition schemes that under-utilize computing resource for the partition operation or the subsequent operation.

In one embodiment, cDBMS 100 determines that if multiple datasets are partitioned according to a particular partition scheme, the subsequent operation for which the multiple data sets are partitioned may yield inaccurate results. For example, the selected partition schemes for the multiple data sets needs to preserve a symmetry of partition identifiers in the partition operation in order for the subsequent operation to be accurate (as discussed above). If a partition scheme for the multiple data sets does not support the symmetry of partition identifiers, the partition scheme is eliminated and will not be selected by cDBMS 100.

Additionally or alternatively, cDBMS 100 uses a load balance optimization policy to eliminate one or more partition schemes from selection for a partition operation. The load balance optimization policy may also be used to select a particular partition scheme for the partition operation. Using the load balance optimization policy, cDBMS 100 ensures that the final number of partitions in a partition scheme closely matches the number of processing units available for the subsequent operation. Accordingly, cDBMS 100 may eliminate partition scheme(s) that would cause load imbalance for processing units performing the subsequent operation in cDBMS 100.

Additionally or alternatively, cDBMS 100 uses another resource-based optimization policy to minimize the consumption of resources for the partition operation itself. cDBMS 100 may eliminate partition scheme(s) that have greater number of iterations than others by applying the iteration based policy. For example, cDBMS 100 may eliminate all the partition schemes that have greater than the minimum number of iterations within the generated partition schemes, or select a partition scheme that has the minimum number of iterations.

Additionally or alternatively, cDBMS 100 may use yet another resource-based optimization policy to minimize the consumption of resources for the partition operation. The performance of the partition operation is better with a partition scheme that has balanced fan-outs in each of its iterations, i.e. the difference in number of partitions per iteration is minimal in a partition scheme. Accordingly, cDBMS 100 may eliminate partition scheme(s) that have highest number of partitions in an iteration than other partition scheme(s) by applying the partition-per-iteration based optimization policy. For example, cDBMS 100 may eliminate a partition scheme with a maximum number of partitions in an iteration or select a partition scheme with the minimum difference(s) in number of partitions across iterations in the partition scheme.

Figure 5:
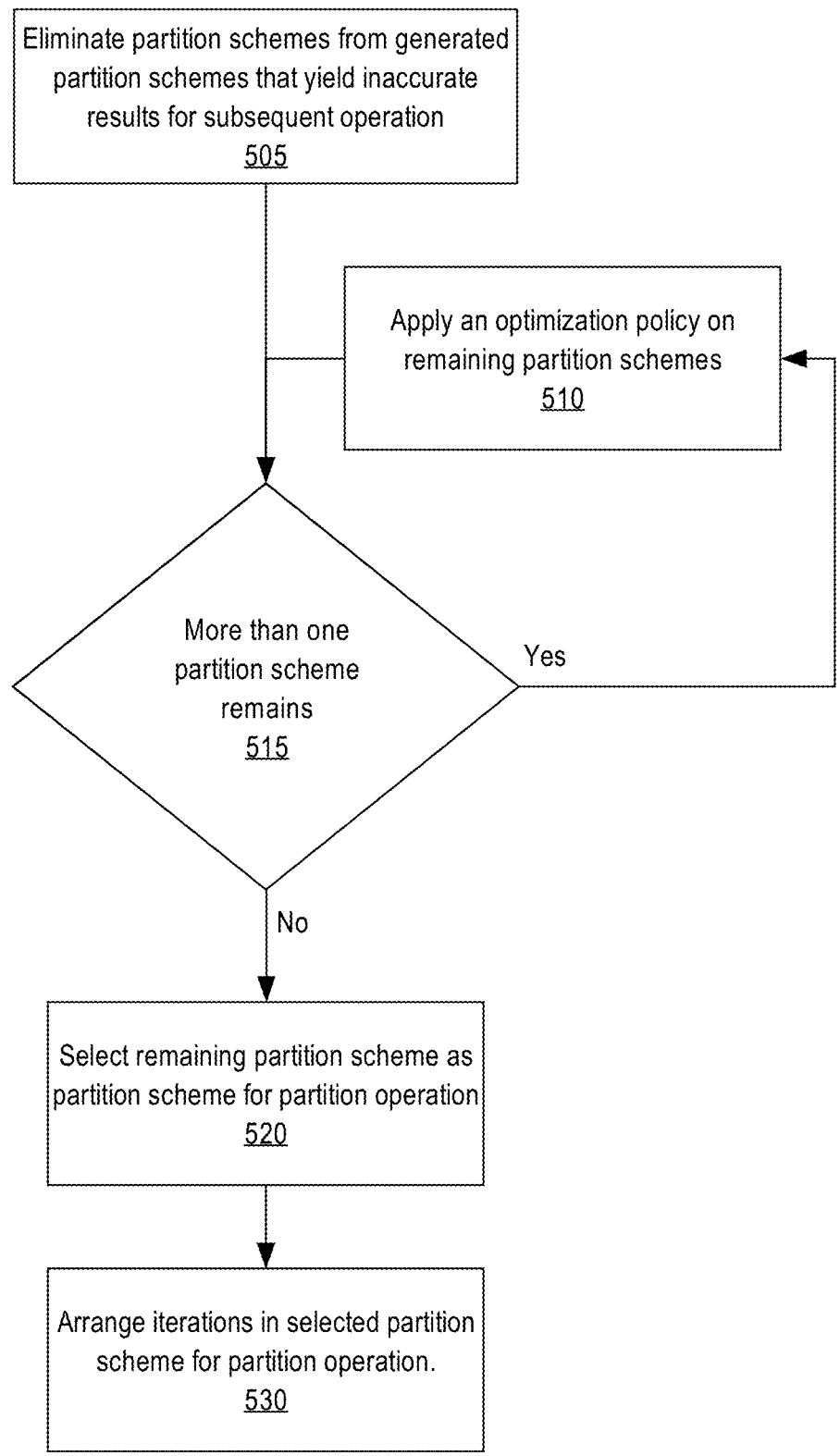
FIG. 5 is a flow diagram for selecting a partition scheme for a partition operation, in an embodiment.

In an embodiment, one or more optimization schemes are applied in a particular order depending on a configuration of cDBMS 100. FIG. 5 is a flow diagram for selecting a partition scheme for a partition operation, in an embodiment. At block 505, one or more partition schemes that may yield inaccurate results, are eliminated. For example, using the above examples of partition schemes for data sets A and B for an exemplary subsequent join operation, first partition schemes of data set A would yield inaccurate join results if used with partitions generated from the first, second, third, and fourth partition schemes of data set B. None of these partition schemes for data set B results in 160 partitions that first partition scheme for data set A would require for preserving a symmetry of partition identifiers. Therefore, cDBMS 100 may eliminate the first partition scheme of data set A from further consideration.

Similarly, in the examples of partition schemes, the third partition scheme of data set A also violates symmetry of partition identifiers with the first, second and third partition schemes of data set B. The third partition scheme of data set A uses only power-of-two partitioning, while the first and second partition schemes of data set B have a non-power-two-partition in at least one iteration of the partition schemes. Furthermore, the resulting partitions numbers for those partition schemes similarly misalign: 128 partitions for data set A and 120 partitions for data set B. Accordingly, the generated partition identifiers for data sets A and B using these partition schemes cannot be symmetrical and may yield inaccurate results for the join operation. However, since the first partition scheme of data set A does not violate the symmetry of partition identifiers at least with one other partition scheme of data set B, such as the fourth partition scheme of data set B (and vice versa), cDBMS 100 may not eliminate these partition schemes at this time.

Continuing with FIG. 5, at block 510, an optimization policy may be applied to the remaining partition schemes of the data sets, if more than one partition scheme remains at block 515 after the accuracy of the partition schemes have been evaluated. In an embodiment, cDBMS 100 may apply optimization policies at block 510 in a particular order. For example, the load balance optimization policy may be applied first to the partition schemes, followed by the number-of-iterations-based optimization policy, and then followed by the number-of-partitions-per-iteration based optimization policy.

Continuing with the example for the partition schemes for data sets A and B, cDBMS 100 further evaluates the partition schemes based on the optimization policies to select a partition scheme for each of the data sets for the partition operation. For example, cDBMS 100 may apply the load balance optimization policy first.

In an embodiment, cDMBS 100 applies load balance policy by calculating load imbalance metric for each of the remaining partition schemes. For example, the load imbalance metric for the remaining second partition scheme of data set A, as calculated for 120 processing units using the above load balance equation, is ceiling (120/120)/(120/120)=1, which is a perfectly balanced partition scheme. For the third partition scheme of data set A, the load imbalance is calculated to be ceiling (128/120)/(128/120)=1.875, which is greater than the second partition scheme's load imbalance metric and thus, is more imbalanced. Accordingly, cDBMS 100 eliminates the third partition scheme. After the elimination, the only partition scheme left for data set A in this example is the second partition scheme. Thus, at block 520, the second partition scheme is selected for the data set A's partition operation.

Continuing with the above examples, for data set B, the fourth partition scheme of data set B yields a similar load imbalance when the load balance optimization policy is applied. Thus, cDBMS 100 eliminates the fourth partition scheme, leaving the first, second and third partition schemes that have perfect load balance for further consideration for data set B at block 515. To further eliminate partition schemes for data set B at block 510, the iterations-based optimization policy is applied to the remaining partition schemes. The first partition scheme of data set B has 3 iterations while the second and third partition schemes have only 2 iterations. Thus, cDBMS 100 eliminates the maximum iteration number partition scheme, the first partition scheme at block 510.

The remaining second and third partition schemes are evaluated by applying the partitions-per-iteration optimization policy at block 510. The second partition scheme provides for 10 partitions in one iteration and 12 partitions in another iteration, while the third partition scheme provides for 20 partitions in one iteration and 6 partitions in another iteration. The maximum number of partitions are used in the third partition scheme in the iteration of 20 partitions. Thus, the number of partitions per iteration in the third partition scheme is less balanced than in the second partition scheme. Accordingly, cDBMS 100 may eliminate the third partition scheme at block 510. The only remaining partition scheme for data set B, the second partition scheme, is selected as the partition scheme for partition operation at block 520.

Once a partition scheme is selected, at block 530 cDBMS 100 may arrange the iterations in the partition scheme in any order that does not violate partition identifier symmetry. In an embodiment, if any non-power-two partitioning iteration exists in a partition scheme, then cDBMS 100 is configured to arrange any one or more non-power-of-two partitioning iteration as the last iterations in the partition scheme. Additionally or alternatively, when multiple datasets are operated on in a subsequent operation, cDBMS 100 is configured to arrange any one or more non-power-of-two partitioning iterations of the selected partition scheme to be either the first or the last iteration(s) in the partition schemes of the respective data sets. With all non-power-of-two partition iterations arranged before or after the power-of-two partitioning iterations, the symmetry of partition identifiers are preserved for the partitions of the multiple data sets.

Continuing with the above examples, for data set A, cDBMS 100 has selected the second partition scheme that includes 10 partitions in one iteration, 6 partitions in another iteration, and 2 partitions in yet another iteration and for data set B, cDBMS 100 selected the second partition scheme that includes 10 partitions in one iteration and 12 partitions in another iteration. cDBMS 100 may arrange the iterations for data set A so the power-of-two partitioning iteration is first, with 2 partitions in the first iteration, 10 partitions in the next iteration and 6 partitions in the last iteration. Data set B's partition scheme having no power-of-two iteration, can be arranged in any way.

Database Management Systems

A database management system (DBMS), such as cDBMS, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables.

The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system, such as a cDBMS, is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
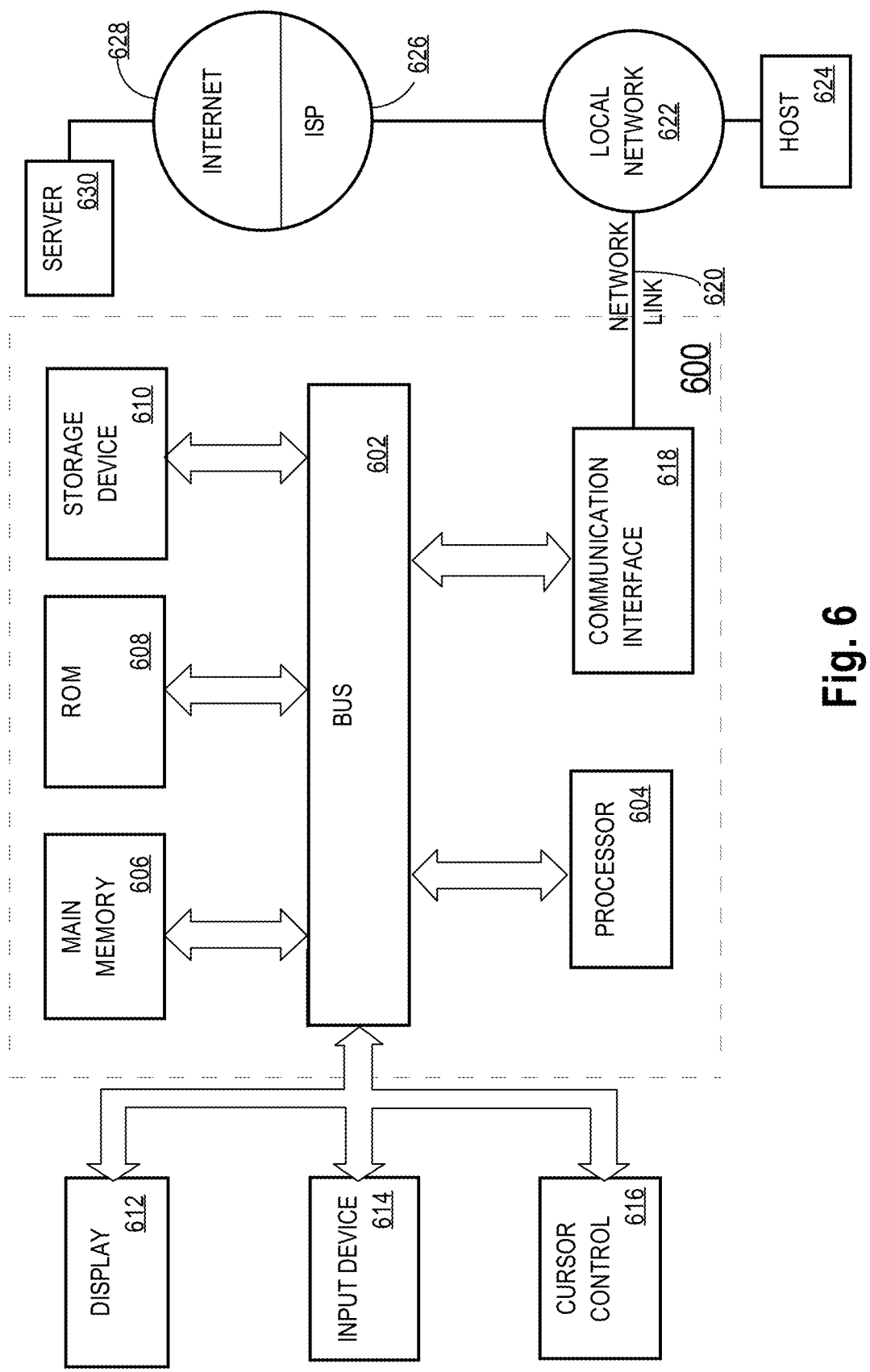
FIG. 6 is a block diagram that illustrates a computer system upon which an embodiment of the approach may be implemented.

For example, FIG. 6 is a block diagram that illustrates a computer system 600 upon which an embodiment of the approach may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    partitioning tuples of a data set to a non-power-of-two number of target partitions, at least by:
        identifying a number for the target partitions into which to partition the data set, wherein the number of the target partitions is not a power-of-two number;
        transforming a tuple of the tuples of the data set into a transformed value using a transformation algorithm, and
        using the transformed value for the tuple, determining a partition identifier for the tuple based on scaling the non-power-of-two number of the target partitions by a scaling value; and performing the partitioning of the tuples of the data set to generate the target partitions for the data set, wherein at least one partition in the target partitions is identified by the partition identifier.

2. The method of claim 1, further comprising:
based on the non-power-of-two number of the target partitions scaled by the scaling value, calculating a number of address bits to be used for partitioning the tuples of the data set;
determining the partition identifier at least by selecting the number of address bits from the transformed value of the tuple.

3. The method of claim 2, wherein an exponentiation of two to the number of address bits is greater than or equal to a product of the scaling value and the non-power-of-two number of the target partitions.

4. The method of claim 1, further comprising:
based on the non-power-of-two number of the target partitions scaled by the scaling value, calculating a number of address bits to be used for partitioning the tuples of the data set; and
determining the partition identifier for the tuple at least by:
selecting the number of address bits from the transformed value of the tuple as an initial address value for the tuple,
multiplying the initial address value of the tuple by the non-power-of-two number of the target partitions thereby calculate a resulting product value, and
right shifting the resulting product value by the number of address bits.

5. The method of claim 1, wherein the transformation algorithm is a hash algorithm.

6. The method of claim 5, wherein the hash algorithm is one of Cyclic Redundancy Check (CRC) algorithm, a Secure Hash Algorithm (SHA) algorithm, or a Message Digest (MD) algorithm.

7. The method of claim 1, wherein the scaling value is greater than or equal to 10 and is less than or equal to 28.

8. The method of claim 1, wherein the scaling value determines a skew for a distribution of the tuples of the data set.

9. The method of claim 1, further comprising determining a partition scheme for a partition operation to partition the tuples of the data set from a database among a cluster of nodes, wherein at least one iteration in the partition scheme specifies the non-power-of-two number of the target partitions to distribute the tuples of the data set.

10. The method of claim 9, wherein another iteration in the partition scheme specifies a power-of-two number of partitions into which to distribute the tuples of the data set.

11. One or more non-transitory computer-readable media storing a set of instructions, wherein the set of instructions includes instructions, which when executed by one or more hardware processors, cause:
partitioning tuples of a data set to a non-power-of-two number of target partitions, at least by:
identifying a number for the target partitions into which to partition the data set, wherein the number of the target partitions is not a power-of-two number;
transforming a tuple of the tuples of the data set into a transformed value using a transformation algorithm, and
using the transformed value for the tuple, determining a partition identifier for the tuple based on scaling the non-power-of-two number of the target partitions by a scaling value; and
performing the partitioning of the tuples of the data set to generate the target partitions for the data set, wherein at least one partition in the target partitions is identified by the partition identifier.

12. The one or more non-transitory computer-readable media of claim 11, wherein the set of instructions further includes instructions, which when executed by said one or more hardware processors, cause:
based on the non-power-of-two number of the target partitions scaled by the scaling value, calculating a number of address bits to be used for partitioning the tuples of the data set;
determining the partition identifier at least by selecting the number of address bits from the transformed value of the tuple.

13. The one or more non-transitory computer-readable media of claim 12, wherein an exponentiation of two to the number of address bits is greater than or equal to a product of the scaling value and the non-power-of-two number of the target partitions.

14. The one or more non-transitory computer-readable media of claim 11, wherein the set of instructions further includes instructions, which when executed by said one or more hardware processors, cause:
based on the non-power-of-two number of the target partitions scaled by the scaling value, calculating a number of address bits to be used for partitioning the tuples of the data set; and
determining the partition identifier for the tuple at least by:
selecting the number of address bits from the transformed value of the tuple as an initial address value for the tuple,
multiplying the initial address value of the tuple by the non-power-of-two number of the target partitions thereby calculate a resulting product value, and
right shifting the resulting product value by the number of address bits.

15. The one or more non-transitory computer-readable media of claim 11, wherein the transformation algorithm is a hash algorithm.

16. The one or more non-transitory computer-readable media of claim 15, wherein the hash algorithm is one of Cyclic Redundancy Check (CRC) algorithm, a Secure Hash Algorithm (SHA) algorithm, or a Message Digest (MD) algorithm.

17. The one or more non-transitory computer-readable media of claim 11, wherein the scaling value is greater than or equal to 20 and is less than or equal to 38.

18. The one or more non-transitory computer-readable media of claim 11, wherein the scaling value determines a skew for a distribution of the tuples of the data set.

19. The one or more non-transitory computer-readable media of claim 11, wherein the set of instructions further includes instructions, which when executed by said one or more hardware processors, cause determining a partition scheme for a partition operation to partition the tuples of the data set from a database among a cluster of nodes, wherein at least one iteration in the partition scheme specifies the non-power-of-two number of the target partitions to distribute the tuples of the data set.

20. The one or more non-transitory computer-readable media of claim 19, wherein another iteration in the partition scheme specifies a power-of-two number of partitions into which to distribute the tuples of the data set.

* * * * *

UNITED STATES PATENT AND TRADEMARK OFFICE
CERTIFICATE OF CORRECTION

| | |
|---|---|
| PATENT NO. | : 11,163,800 B2 |
| APPLICATION NO. | : 16/541605 |
| DATED | : November 2, 2021 |
| INVENTOR(S) | : Koochakzadeh et al. |

Page 1 of 1

It is certified that error appears in the above-identified patent and that said Letters Patent is hereby corrected as shown below:

On the Title Page

Column 1, Item (63) under Related U.S. Application Data, Line 1, delete "Continuation" and insert -- Division --, therefor.

In the Specification

In Column 6, Line 31, delete "cDMBS" and insert -- cDBMS --, therefor.

In Column 11, Line 42, delete "cDMBS" and insert -- cDBMS --, therefor.

In Column 13, Line 56, delete "join" and insert -- joint --, therefor.

In Column 17, Line 1, delete "cDMBS" and insert -- cDBMS --, therefor.

In Column 21, Line 41, delete "cDMBS" and insert -- cDBMS --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*